Jan. 6, 1953
J. D. GAYER
2,624,855
FAN ARRANGEMENT FOR ELECTRICAL DEVICES
Filed Jan. 23, 1951
2 SHEETS—SHEET 1
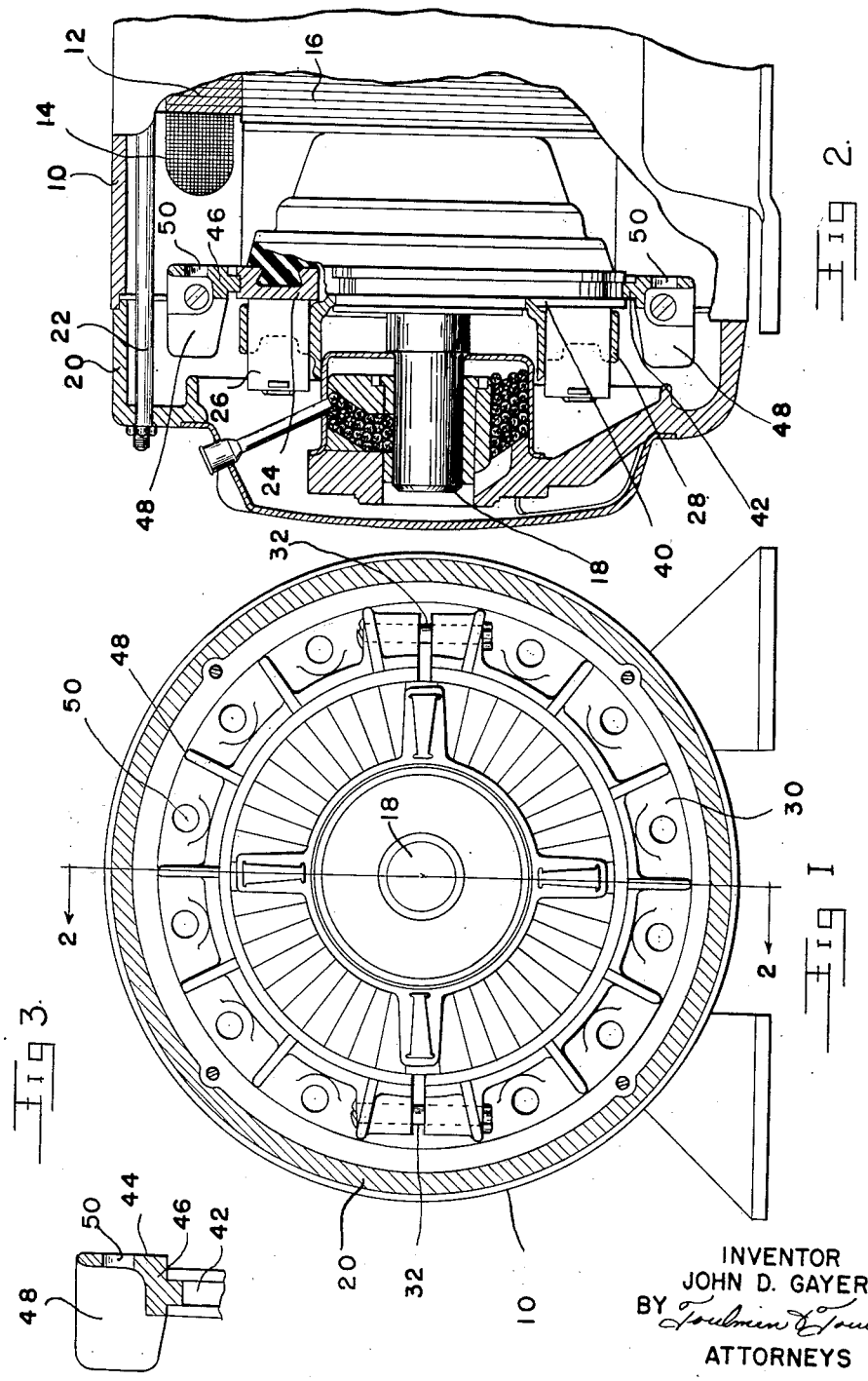
INVENTOR
JOHN D. GAYER
BY *Toulmin & Toulmin*
ATTORNEYS Jan. 6, 1953        J. D. GAYER        2,624,855
FAN ARRANGEMENT FOR ELECTRICAL DEVICES
Filed Jan. 23, 1951        2 SHEETS—SHEET 2
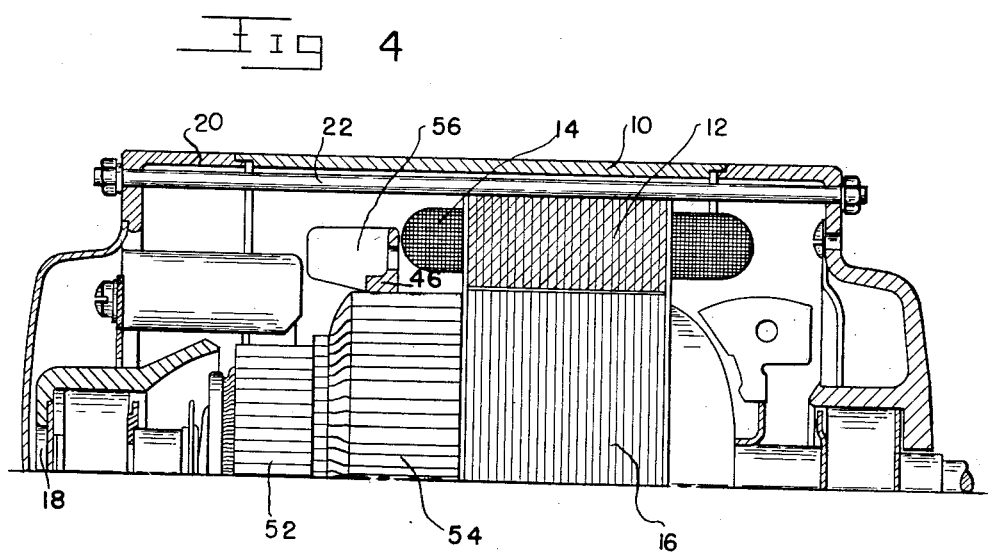
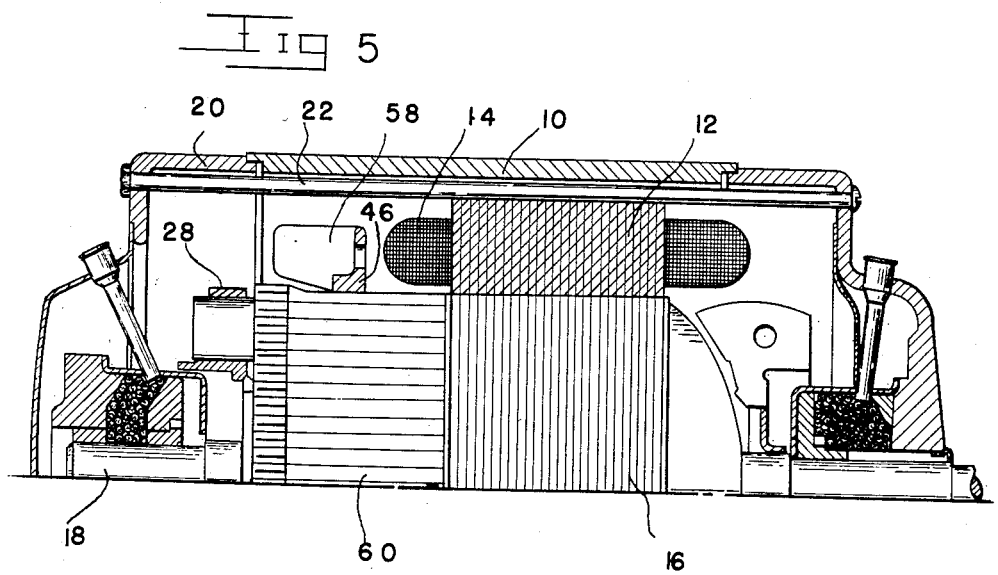
INVENTOR
JOHN D. GAYER
BY
*Toulmin & Toulmin*
ATTORNEYS.

UNITED STATES PATENT OFFICE 2,624,855

FAN ARRANGEMENT FOR ELECTRICAL DEVICES

John D. Gayer, Dayton, Ohio, assignor to The Brown-Brockmeyer Company, Dayton, Ohio, a corporation of Ohio Application January 23, 1951, Serial No. 207,387

5 Claims. (Cl. 310—60)

This invention relates to rotary electrical apparatus, such as motors and generators, and is particularly concerned with a novel fan arrangement therefor for circulating cooling air either through the device or within the device.

In my copending application Serial Number 106,431, filed July 23, 1949, now Patent No. 2,541,235, and assigned to the same assignee as the instant application, I show a fan arrangement for an electric motor or the like wherein the fan is a cast metallic ring open on one side which can be mounted about the periphery of a radial bar type commutator and clamped thereon so as to rotate with the armature of the device and thereby circulate cooling air through or within the frame of the device. The advantages of an arrangement of this type is that cooling air is passed directly over the commutator or is agitated in the neighborhood of the commutator so as to carry off heat therefrom, while at the same time being relatively inexpensive and easily added to a motor without substantially increasing the overall size thereof.

While the fan arrangement of the above-referred to copending application proved to be quite satisfactory so far as circulating air was concerned and ease of manufacture and assembly with the commutator of the device, it nevertheless presented problems and had disadvantages in connection with certain types of motors and some of the applications to which the motors were put.

For example, the metallic fan ring arrangement was relatively heavy even when constructed of aluminum or other light metals and thus increased the weight of the motor to some extent as well as introducing a balancing problem should the fan not be mounted concentrically with the commutator of the device.

In most instances this represented no serious defect in the fan arrangement, but in connection with high-speed motors or with motors wherein the commutator was not machined concentrically with the armature, it did introduce difficulties.

Another drawback found in connection with the metallic split-ring type of fan was that it was not adapted for use in connection with an axial bar type commutator, there not being room to mount the fan on the commutator unless the bars thereof were made of such excessive length as to make the entire arrangement impractical.

In the case of an axial bar type commutator, the only practical location for an auxiliary fan was on the leads extending from the commutator to the windings of the armature. The difficulty that was encountered in connection with the metallic split-ring type fan for that particular adaptation of it was that the fan was almost certain to be eccentric with the armature, and thereby produced a serious problem of unbalance in almost every case.

In some instances it was desirable to mount the auxiliary fan for a radial bar type commutator on the leads extending from the commutator, and in this case the same balancing problem arose as did in connection with the axial bar type commutator referred to above. In both cases described, where the fan ring was mounted on the armature leads extending to the commutator, it was undesirable to have a metallic conducting ring member clamped about the said leads because of the possibility of the ring member chafing through the insulation and enamel on the leads and short-circuiting the armature.

In connection with the mounting of the metallic split ring type of fan ring about the periphery of a commutator, a problem was encountered in certain instances because of dust and other foreign matter that entered the frame of the motor through the cooling openings thereof and became lodged between the fan ring and the periphery of the commutator. Foreign matter of this nature has a tendency to short out because the fan ring extends completely around the commutator and thus provides a conductive path extending to adjacent the points of greatest voltage difference. Thus, foreign matter which would not cause arcing between adjacent of the commutator bars due to the low voltage difference therebetween, would break down between the fan ring and spaced points about the commutator, due to the greater voltage difference encountered, and thereby short out the armature.

Having the foregoing in mind, it is a primary object of this invention to provide an auxiliary fan arrangement for use with electric motors and the like which avoids the difficulties referred to above.

A particular object is to provide an auxiliary fan ring adapted for attachment to the armature of substantially any type of electric motor or generator.

It is also an object to provide a fan ring for an electric motor or generator which is inexpensive to manufacture and which is also light so that it does not cause an unbalance of the rotating member on which it is mounted.

These and other objects and advantages will become more apparent upon reference to the following description taken in connection with the accompanying drawings, in which:

Figure 1 is an end view of an electric motor having a fan ring according to this invention looking in at the commutator end with the end cover of the motor in section;

Figure 2 is a vertical sectional view indicated by line 2—2 of Figure 1;

Figure 3 is a fragmentary view showing the fan ring of this invention in cross-section;

Figure 4 is a fragmentary view of the commutator end of another type of electric motor or generator having an auxiliary fan according to this invention; and Figure 5 is a view like Figure 2, but showing the auxiliary fan mounted in a different location.

Referring to the drawings somewhat more in detail, Figures 1 and 2 show a motor or generator comprising a frame 10 having mounted therein stator 12 with windings 14. Rotatable within stator 12 is rotor or armature 16 also having windings (not illustrated), and a supporting shaft 18. Shaft 18 is journaled in end frame member 20 in a conventional manner which is retained in assembled position in frame 10, as by through bolts 22.

Mounted on shaft 18 is a commutator 24 which is of the radial bar type and bearing on the commutator are brushes 26 mounted in a brush holder 28 that may be arranged to lift the brushes from the commutator, if so desired, when the device is a repulsion-start-induction-run type of motor.

In other cases, when the device is a direct current motor or generator, or another type of alternating current type motor, the brushes 26 will be continuously held against the commutator by brush holder 28.

Mounted about the periphery of the bars of commutator 24 is the fan ring of this invention, indicated by reference numeral 30. This fan ring is preferably made of a plastic material, such as one of the thermal setting phenol formaldehyde molding compounds. Any number of molding compositions are suitable for this purpose, although it is preferred to use a thermal setting substance, and the material employed may include a granulated or fibrous filler if desired in order to give the fan ring added strength, shock resistance, or lightness.

The ring 30 is made in two semi-circular halves which are identical and which are held together by the bolts 32 at diametrically opposite sides of the commutator. The arrangement of two of the bolts 32 in this location minimizes the problem of balancing the armature after the fan ring has been mounted thereon because the bolts and the thickened parts of the fan ring through which the pass substantially counterbalance each other.

In mounting the fan ring about the commutator, I have found it convenient to form an annular undercut, as indicated at 40, about the periphery of the commutator and to provide the fan ring with an inwardly extending raised part 42 to be received in the undercut, so that when the fan ring is clamped about the commutator, it is precisely located and held in exact position thereon at all times.

The fan ring, as will be seen in Figure 3, comprises a substantially flat annular back part 44 and an axially projecting hub 46 from which extends the above-referred to raised part 42. The blades 48 of the fan extend outwardly from back part 44 to substantially beyond the forward edge of hub part 46. As will be seen in Figure 4, when the fan is mounted on a radial bar type commutator, the fan blades extend substantially beyond the face of the commutator, and thus are highly efficient in drawing air over the commutator or for agitating the air in the neighborhood of the commutator.

While the fan ring as described is quite light, it may advantageously be lightened still more without detracting from its efficiency as a fan by providing the apertures 50 in the back part 44 between the blades 48. These apertures 50 also provide a substantial area for the passage of air axially through the fan ring to provide for circulation of air through the motor frame as it may be induced by a conventional circulating fan on the opposite end of the armature.

The described arrangement provides for a fan that is quite light and inexpensive to manufacture, and which, at the same time, inasmuch as it is formed of insulating material, introduces no problems of insulation between the fan and the commutator, and introduces no possibility that the fan ring will short the commutator between spaced points thereof having substantial differences of potential.

An additional advantage in connection with the fan ring of the present invention is that it is adapted for mounting on the armature leads extending between the windings of the armature and the commutator. These leads are usually of relatively stiff wire, and it is customary after an armature has been wound and the commutator placed thereon and the leads connected to the commutator, to dip the armature in an enamel and then to bake it. This procedure makes the windings and the bundle of leads between the commutator and the windings quite hard and solid and resistant to abrasion.

The leads, therefore, provide a firm support for mounting the fan ring when it is necessary or desirable to position it between the commutator and the armature iron.

In Figure 4 there is illustrated a device similar to that shown in Figure 2 and which bears corresponding reference numerals, except that the commutator indicated at 52 is of the axial bar type. The leads extending from the commutator to the windings of the armature are indicated at 54 and the fan ring mounted thereon is indicated at 56. It will be evident that with the axial bar type commutator there is no space on the commutator itself to mount the fan ring, unless the commutator bars are made excessively long, and this, of course, would be an uneconomical expenditure, due to the expense of the copper that would be required and would also add a substantial amount to the overall length of the device.

In Figure 5 there is shown an arrangement substantially identical with that of Figure 2, except that the fan ring, which is indicated at 58, is mounted on the leads 60 extending from the commutator to the armature windings. In connection with both Figures 4 and 5, the advantage obtains that the fan rings are quite light and therefore introduce no serious problem of unbalance when mounted about the necessarily somewhat irregular periphery of the bundle of leads from the commutator to the armature windings.

Also, inasmuch as the fan rings are of insulating material, it is not necessary to introduce insulation between them and the leads, and likewise, the rings being formed of a plastic material, they have less tendency to chafe through the insulation and enamel on the wires comprising the leads, if for any reason there should be vibration between the fan ring and the leads.

A further advantage in connection with the fan ring arrangements of Figures 4 and 5 over that shown in Figure 2, or in my copending application referred to previously, is that the fan rings can be supplied for and mounted on substantially any existing equipment without the necessity of performing any machine work on the commutator of the armature.

The advantages of being able to provide an auxiliary fan in this manner will be evident, and include the one of adapting motors in certain instances to conditions of overload operation, whereas if it were not possible to so equip the motors with auxiliary fans, they would have to be replaced by motors of a larger size.

It will be understood that this invention is susceptible to modification in order to adapt it to different usages and conditions, and, accordingly, it is desired to comprehend such modifications within this invention as may fall within the scope of the appended claims.

I claim:

1. In combination with a wound armature for an electric motor or the like having a commutator and leads extending from the commutator to the windings of the armature, a fan ring for providing local agitation of air in the vicinity of the commutator comprising an annular member of electrical insulating material clamped about the periphery of one of the said commutator and the said leads, said fan ring comprising an inner axially extending ring part and an annular radially extending back part extending from one end of the said ring part, fan blades extending radially outwardly from said ring part and also connected to said back part, said fan ring being formed in two substantially semi-circular parts, and means at the extremities of said semi-circular parts for clamping said fan ring together in position on the said armature, said radially extending back part being provided with apertures therein positioned between the said fan blades to provide for the passage of air through the said back part for general ventilation of the motor by other fan means.

2. In an electric motor or the like; a stator comprising a frame, an armature rotatably mounted in said frame, a fan on one end of said armature for circulating air through said frame, a commutator on the other end of said armature and leads extending from the said commutator to the windings of said armature, an auxiliary fan mounted about the periphery of the said armature at the commutator end for local agitation of the air in the vicinity of the commutator and comprising a pair of substantially semi-circular members of insulating material having fan blades extending radially therefrom, there being means at the extremities of said semi-circular members for interconnecting them and clamping them about the said armature, each member being composed of an axially extending ring part and a radial flange part extending out from one end of the ring part with the blades of the auxiliary fan being connected with both of the ring and flange, said flange fitting relatively closely inside said frame and being apertured between the said blades for the passage of air blown by the first mentioned fan.

3. In an electric motor or the like; a stator comprising a frame, an armature rotatably mounted in said frame, a fan on one end of said armature for circulating air within said frame, a commutator on the other end of said armature and leads extending from the said commutator to the windings of said armature, an auxiliary fan mounted about the periphery of said armature at the commutator end and comprising a pair of substantially semi-circular members of insulating material having fan blades extending radially therefrom, there being means at the extremities of said semi-circular members for interconnecting them and clamping them about the said armature, each of the said members comprising an inner axially extending ring part and a radially extending back part from which parts the said fan blades project, and said back part being provided with apertures positioned between the said fan blades whereby the said first-mentioned fan can circulate air through the entire motor frame, whereas the second-mentioned fan is adapted for agitating the air within the frame at the commutator end of the armature.

4. An arrangement according to claim 3 wherein the auxiliary fan is clamped about the said leads between the commutator and the windings of the armature.

5. An arrangement according to claim 3 wherein the auxiliary fan is clamped about the periphery of said commutator.

JOHN D. GAYER.

REFERENCES CITED

The following references are of record in the file of this patent:

UNITED STATES PATENTS

| Number | Name | Date |
|---|---|---|
| 1,278,865 | Curtis | Sept. 17, 1918 |
| 1,824,839 | Ross | Sept. 29, 1931 |
| 2,460,752 | Jacobson | Feb. 1, 1949 |
| 2,461,985 | Kalikow | Feb. 15, 1949 |

FOREIGN PATENTS

| Number | Country | Date |
|---|---|---|
| 167,283 | Switzerland | May 1, 1934 |
| 214,430 | Great Britain | Apr. 24, 1924 |
| 395,758 | France | Jan. 6, 1909 |